May 18, 1965 G. D. WORTHINGTON 3,184,535
COMPRESSION CONNECTOR FOR JOINING WIRES
Filed Dec. 31, 1962
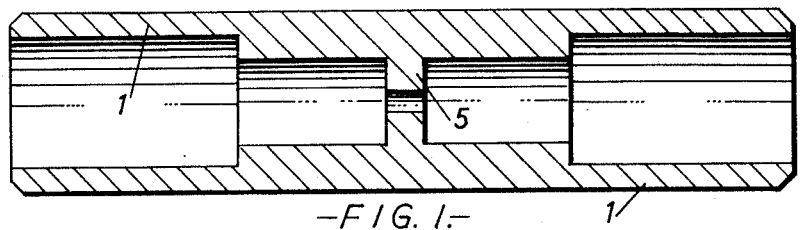
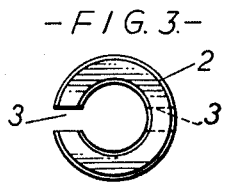
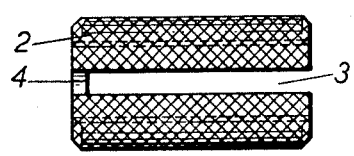
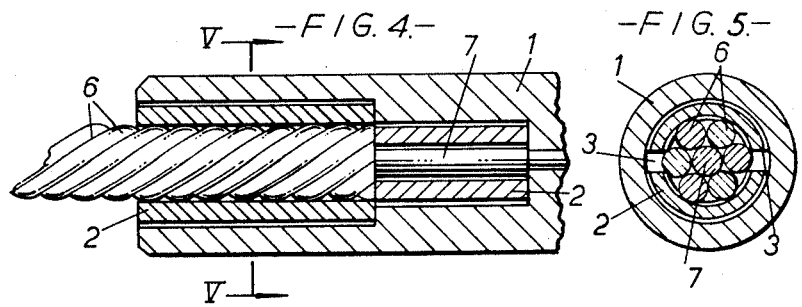
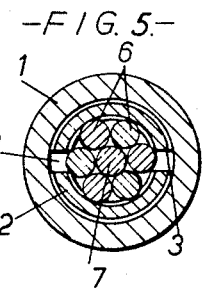
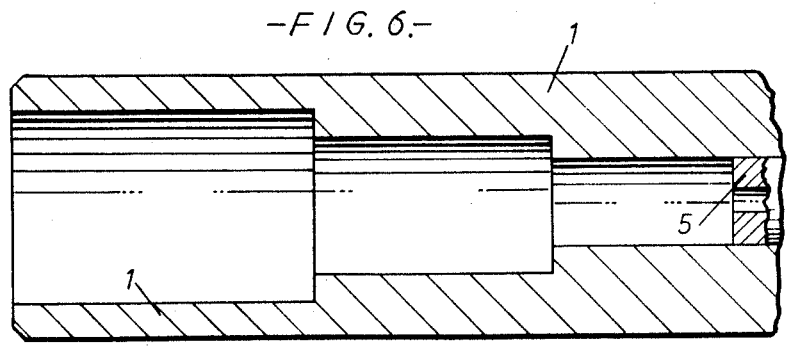
INVENTOR:
GEORGE DOUGLAS WORTHINGTON
BY
Abraham A. Saffitz
ATTORNEY

United States Patent Office 3,184,535
Patented May 18, 1965

3,184,535
COMPRESSION CONNECTOR FOR JOINING WIRES
George Douglas Worthington, Kingston-on-Thames, England, assignor to Cable Covers Limited, London, England
Filed Dec. 31, 1962, Ser. No. 248,654
Claims priority, application Great Britain, Jan. 9, 1962, 1,029/62
1 Claim. (Cl. 174—90)

The invention relates to connectors for use when it is desired to join the ends of wires, rods and other similar or suitable members, somewhat of the kind described in the specification of my co-pending British patent application Serial No. 39,080 of 1958.

The object of the present invention is the provision of a new or improved construction of connector of the kind aforesaid more particularly intended for mid-span joints for electrical conductors having an envelope of aluminium or other wires stranded round a core of high tensile strength steel wire.

According to the invention the connector comprises an outer sleeve or shell having an axial bore at each end, each of the end bores being connected to at least one intermediate bore having a different diameter, the two different diameters being adjacent to each other and thereby adapted to accommodate a tubular insert of corresponding diameter for receiving the ends of pared-back cored conductors, wires, rods or like members, whereby upon the said sleeve being compressed the separate inserts bite into or grip the core and the pared-back surrounding strands of wire and simultaneously bite and grip the interior of sleeve.

In order that the invention may be fully and clearly comprehended the same will now be described with reference to the accompanying drawings, in which:

FIGURE 1 is an axial section of the outer sleeve of a connector according to one embodiment of the invention.

FIGURE 2 is an elevation of one of a pair of tubular inserts for the sleeve illustrated at FIGURE 1, there being two other similar but smaller inserts required to complete the connector.

FIGURE 3 is an end view of FIGURE 2.

FIGURE 4 is an axial section of one end of a connector according to the invention depicting the securing therein of an electrical conductor having an envelope of wires stranded round a core or rod.

FIGURE 5 is a cross-section on the line V—V of FIGURE 4.

FIGURE 6 is an axial section of one end of an outer sleeve for a connector according to a modification of the invention.

Similar reference numerals refer to similar parts throughout the several views.

Referring to FIGURES 1-5, the connector includes a sleeve or shell 1 (FIGURE 1) of circular cross-sectional shape which is axially bored from each end to provide a pair of aligned two-diameter bores.

The inner bore of each pair of aligned bores is of less diameter than the outer bore of each pair and is adapted to have slidably located therein an insert 2 (FIGURES 2 and 3) of appropriate size, the two inserts being introduced to the sleeve 1 from opposite ends of the latter.

Also slidably located in each outer bore of each pair of aligned bores of the sleeve 1 is another insert 2 of appropriate size.

Both sets of inserts 2 are of tubular formation each preferably furnished with a pair of diametrically opposite longitudinal slots 3 one of which slots extends the whole length of the insert with the other slot terminating somewhat short of one end to provide a land 4. The interiors of the inserts are threaded, toothed or otherwise treated to provide biting surfaces, whilst their exteriors are knurled, serrated or otherwise roughened.

If desired, the sleeve may include a midfeather 5 which may either be integral therewith (see FIGURES 1 and 4) or separate therefrom (see FIGURE 6).

When it is desired to employ a connector according to the invention for effecting the joining of the ends of a pair of cored conductors, cables or the like of the kind set forth, the said ends are treated in the following manner. First, the aluminium or other strands of wire 6 surrounding the high tensile strength wire core or rod 7 are pared back or cut away to expose the core for an amount corresponding to the length of the inner inserts 2 already described.

Thereafter, the exposed or bared portions of the cores 7 are introduced to the shell or sleeve from opposite ends and located in the respective inner—smaller diameter—bores of the shell and with the ends of the surrounding strands of wire located or housed in the respective outer—greater diameter—inserts.

By employing any suitable appliance for cold-swaging or compressing the sleeve or shell the internal threads or teeth of the inner inserts are caused to bite into or grip the cores 7, the internal threads or teeth of the outer sets of inserts are caused to bite into or grip the outer strands of wire 6 and the knurled, serrated or similar external means of the several inserts 2 are simultaneously caused to bite into or be retained in the corresponding locating bores of the shell or sleeve 1.

In this manner and by the means heretofore described there is provided an extremely secure joint possessing great strength and capable of highly efficient electrical conduction.

For dealing with conductors, cables or like devices provided with two or more surrounding sets of strands, the sleeve or shell would be designed and adapted with the requisite number of different diameter bores and inserts whereby when the two or more sets of strands had been pared-back or cut away in stepped manner the cores and the several sets of strands of the cables or conductors to be connected or joined would each be accommodated within and secured by its own insert. FIGURE 6 illustrates the kind of shell 1 required for accommodating a cored cable having two sets of surrounding strands of wire.

In the event of the device being intended for terminating a conductor or like member the sleeve would be designed to accommodate inserts 2 at one end whilst the opposite end of the sleeve could be bored, threaded or otherwise adapted for anchorage in any suitable manner.

I claim:

A cylindrical compression connector for joining ends of stranded wires consisting essentially of: a malleable metal outer sleeve having an axial circular cross sectional bore at each end of said sleeve and an intermediate circular cross sectional bore between and connecting the end bores, said intermediate bore being of lesser diameter than the diameter of said end bores and being provided with a wall portion of constricted tubular diameter at the middle thereof for accommodating separate strands of wire from opposite sides of the connector, first metal tubular sleeve inserts corresponding in outer diameter to the inner diameters of each of said end bores disposed in each of said end bores, second metal tubular sleeve inserts corresponding in outer diameter to the inner diameter of said intermediate bore being disposed in each end of said intermediate bore; each of said first and said second tubular inserts being formed with diametrically opposed longitudinal slots, one of said slots extending the whole length thereof and the other of said slots terminating short of the end to provide a land portion, the interior of each of said first inserts and said second inserts being roughened for gripping wires which extend through the inserts; the exterior of each of said tubular inserts also being roughened whereby cold-swaging compresses the outer sleeve against the roughened surfaces of the accommodated inserts and simultaneously grips the ends of the stranded wire along the roughened interior surfaces of said inserts while the stepped diameters between the outer axial bore portions and the intermediate bore portions accommodate individual pared back strands of said stranded wire ends in gripping engagement at the middle constricted wall portion.

References Cited by the Examiner

UNITED STATES PATENTS 1,909,344  5/33  Green et al. _____ 287—109 X
3,033,600  5/62  Drysdale.

FOREIGN PATENTS 561,859  6/44  Great Britain.

E. JAMES SAX, *Primary Examiner.*

DARRELL L. CLAY, JOHN P. WILDMAN, *Examiners.*